(12) United States Patent
Keller et al.

(10) Patent No.: US 12,716,460 B2
(45) Date of Patent: Aug. 25, 2026

(54) BRAKE LINING SYSTEM AND SENSOR UNIT

(71) Applicant: BECORIT GmbH, Recklinghausen (DE)

(72) Inventors: Fred Keller, Haltern am See (DE); Tomas Tot, Ennepetal (DE); Jan Füser, Bönen (DE)

(73) Assignee: BECORIT GmbH, Recklinghausen (DE)

( * ) Notice: Subject to any disclaimer, the term of this patent is extended or adjusted under 35 U.S.C. 154(b) by 441 days.

(21) Appl. No.: 18/260,343

(22) PCT Filed: Jan. 6, 2022

(86) PCT No.: PCT/EP2022/050182
§ 371 (c)(1),
(2) Date: Jul. 5, 2023

(87) PCT Pub. No.: WO2022/148798
PCT Pub. Date: Jul. 14, 2022

(65) Prior Publication Data

US 2024/0093741 A1 Mar. 21, 2024

(30) Foreign Application Priority Data

Jan. 8, 2021 (DE) ..................... 10 2021 100 194.3
Feb. 10, 2021 (DE) ..................... 10 2021 103 068.4

(51) Int. Cl.
*F16D 66/02* (2006.01)
*F16D 65/092* (2006.01)

(52) U.S. Cl.
CPC ......... *F16D 66/024* (2013.01); *F16D 65/092* (2013.01)

(58) Field of Classification Search
CPC . F16D 66/024; F16D 65/092; F16D 2066/001
See application file for complete search history.

(56) References Cited

U.S. PATENT DOCUMENTS 5,839,545 A * 11/1998 Preston ................. F16D 66/024 340/454
2010/0314203 A1 12/2010 Kohler et al.

FOREIGN PATENT DOCUMENTS

| | | | |
|---|---|---|---|
| DE | 3543457 | A1 | 6/1987 |
| DE | 4227725 | A1 | 2/1994 |
| DE | 4237679 | A1 | 5/1994 |
| DE | 102012012876 | A1 | 12/2013 |
| EP | 0599033 | A1 | 6/1994 |

OTHER PUBLICATIONS

German Patent No. DE 3640888 to Braun et al published on Aug. 10, 1989.*

(Continued)

*Primary Examiner* — Pamela Rodriguez
(74) *Attorney, Agent, or Firm* — K&L Gates LLP

(57) ABSTRACT

A brake lining system for a disc brake of a rail vehicle is shown and described, with a pad holder and with at least one brake pad connected to the pad holder, preferably with two brake pads, and with a sensor device with a sensor unit having at least one wear sensor for determining a state of wear of the brake pad.

12 Claims, 7 Drawing Sheets

(56) References Cited

OTHER PUBLICATIONS

German Patent No. DE 19823022 to Zenzen published on Jan. 5, 2000.*
European Patent No. EP 2012037 to Wille et al published on Jan. 7, 2009.*
European Patent No. EP 3743636 to Blessing et al published on Jan. 18, 2023.*
Translation of German Patent No. DE 4237679 to Thiel et al obtained from website: https://worldwide.espacenet.com on Oct. 8, 2025.*
International Search Report and Written Opinion in PCT/EP2022/050182, May 2, 2022, 6 pages (translation only).

* cited by examiner

BRAKE LINING SYSTEM AND SENSOR UNIT

CROSS-REFERENCE TO RELATED APPLICATIONS

The present application is the U.S. national stage application of international application PCT/EP2022/050182 filed Jan. 6, 2022, which international application was published on Jul. 14, 2022, as International Publication WO 2022/148798. The international application claims priority to German Patent Application No. 10 2021 100 194.3 filed Jan. 8, 2021, and to German Patent Application No. 10 2021 103 068.4, filed Feb. 10, 2021. The international application and the German applications are hereby incorporated herein by reference in their entireties.

BACKGROUND

The invention relates to a brake lining system for a disc brake of a rail vehicle, with a pad holder and with at least one brake pad connected to the pad holder, preferably with two brake pads connected to the pad holder. Furthermore, the present invention relates to a sensor unit for a brake lining system for a disc brake of a rail vehicle.

Known brake pads or parts thereof are inserted in brake pad systems of known design in railway vehicles into a pad holder, mostly by means of a dovetail guide. The brake pads then have a friction surface size whose effective area cannot be changed during use. With different locking devices, it is possible to securely close the dovetail guide as soon as the brake pad or brake pads are in this guide. Furthermore, modular brake lining systems are also known, for example, from DE 10 2012 012 876 A1, with carrier plates held on at least one back part and with a plurality of different friction segments, wherein different friction segments have friction surfaces with different geometry and/or with different size and/or with different coefficient of friction and/or different friction materials and wherein different friction segments of the brake lining system can be fastened to the carrier plates as required.

During the operation of rail vehicles, the brake pads are subjected to high mechanical loads, which causes the brake pads, including the retainer systems, to seize up. Incidentally, during the braking process, the temperature of the brake disc rises sharply, which promotes wear of the brake pads. Due to non-optimal pressure and speed distributions over the cross-section of the brake pads, wear increases further and can also occur very irregularly over the surface of the brake pads. In addition to the material temperature and material-specific properties of the pads, wear on brake pads is particularly dependent on the speed at which the brake disc moves past the friction surfaces of the brake pads and on the contact pressure of the friction surfaces against the brake disc.

In order to check the wear-related abrasion of brake linings and to check for any wear-related damage to the brake lining system, the brake linings and lining holders are visually inspected by the maintenance staff on the basis of empirical values of the train fleets after reaching certain operating durations and/or after reaching certain operating kilometres, and on the basis of the inspection, recommendations for action are made for a brake lining replacement and/or, if necessary, further repair measures to the brake lining system. However, the visual inspection of the brake pad wear and the wear condition of the brake pad system is error-prone and the quality of the inspection depends on the experience of the maintenance personnel. Therefore, it cannot be excluded that the wear condition of brake linings and brake lining systems is not correctly assessed by the maintenance personnel with the consequence that the brake lining is replaced too late. This can have a negative effect on the functional safety of the brake system and endanger safety in rail traffic. In addition, excessive wear of the brake pads can lead to wear-related damage to other components of the brake pad system, especially the pad holder.

SUMMARY

The object of the present invention is to provide a brake lining system of the type mentioned at the outset which permits, in a cost-effective and constructively simple manner, the possibility of determining the state of wear of the brake linings used, in particular automatically and independently of a visual inspection. In particular, it is the task of the present invention to create a possibility for determining, in particular automatically, a state of wear of the brake lining which can be retrofitted in a simple manner and can be used universally with different brake lining systems. Moreover, a high degree of reliability of the wear detection is to be ensured.

The aforementioned tasks are solved by a brake lining system having the features of claim 1 and by a sensor unit for a sensor device of a brake lining system having the features of claim 10. Advantageous embodiments of the invention are the subject of the subclaims.

To solve the aforementioned tasks, a brake lining system for a disc brake of a rail vehicle with a lining holder and with at least one brake lining connected to the lining holder, preferably with two brake linings, is proposed according to the invention, which has a sensor device with a sensor unit having at least one wear sensor for determining a state of wear, i.e. the degree of wear or abrasion of the brake lining Several sensor units can also be provided in order to detect the wear at different points of the friction lining. The wear sensor is designed as a component of the sensor device and is set up to determine the wear condition of the brake lining, preferably during operation of the disc brake. The sensor device also has an evaluation unit connected to the sensor unit by wireless or wired means, which is designed to evaluate the sensor signals and to generate at least one wear warning and/or wear indication and can comprise corresponding display means.

The term "brake lining system" in the sense of the invention is to be interpreted broadly and in principle relates to any brake lining construction in which at least one brake lining is attached to and held by a lining holder. Preferably, however, the present invention relates to brake lining constructions in which the brake lining or brake linings lie with a dovetail in a corresponding lining guide of a brake lining holder.

The wear condition of the brake lining can be determined qualitatively or quantitatively. In the qualitative determination, the event of reaching a certain degree of wear or a certain abrasion thickness of a friction material layer of the brake lining and/or a certain residual lining thickness of the brake lining is detected. In the quantitative determination, the amount of the abrasion thickness of a friction material layer of the brake lining and/or the amount of the residual lining thickness of the brake lining can be determined in [mm]. A discontinuous or also a continuous wear determination is possible.

Several sensors can be integrated into the sensor unit, whereby a first sensor can be provided for detecting a first wear condition of the friction lining, whereupon a first wear indication is generated upon detection of the first wear condition. A second sensor is provided for detecting a second, more severe state of wear, in particular before a certain wear limit is reached, whereupon a second wear indication is generated when the second state of wear is detected.

The wear sensor can operate without contact and be designed as a proximity sensor or (over)temperature sensor. As soon as the brake lining is worn down to such an extent that the distance between the sensor and the brake disc is sufficiently small and/or the sensor temperature rises above a predefined limit value, a wear warning can be generated and/or a wear indicator can be provided.

The wear sensor can also be designed as a contact sensor. If the sensor contacts the brake disc when a certain degree of wear of the friction lining is reached and ground contact occurs, a wear warning is generated. Finally, the sensor unit can also comprise a wear element that contains a conductor which is cut through the brake disc at a certain value, preferably before the wear limit of the brake lining, and thus separates a ground connection, which then results in a wear warning.

The sensor unit and/or its wear element are heat-resistant at least until the limit values of the operating temperature of the brake pads and/or the disc brake are reached during braking operation. Metallic materials or preferably thermosets can be used. If a conductor loop is implemented in a wear element, this is also temperature-resistant until the maximum operating temperature is reached.

Also not excluded is an embodiment in which a cable loop is embedded in the friction material of the brake pad and ground contact occurs when the wire contacts the brake disc when the brake pad reaches a certain degree of wear, which then results in a wear warning. An interruption of a ground contact can also lead to a wear warning.

In a particularly preferred embodiment of the brake lining system according to the invention, however, the sensor unit is formed by a separate structural unit, in particular wherein the sensor unit is a retrofit part which is adapted to the common, standardized geometries of lining holders and of brake linings of known brake lining designs.

Particularly preferably, the sensor unit is adapted as a separate structural unit to a lining holder which complies with the standard DIN EN 16451:2015-09 and/or adapted to a brake lining which complies with the standard DIN EN 15328:2020-10 or the standard UIC 541-3, 8th edition as a template for the aforementioned standard.

The design of the sensor unit as a separate component makes it possible to mount the sensor unit on the mounted brake lining system with little effort and to replace the sensor unit with little effort, in particular whereby the sensor unit can be replaced together with the friction linings.

Adapted to the geometries of common brake pad designs, the sensor unit can also be retrofitted to existing brake pad systems with little effort, without having to modify the design of the brake pad system, i.e. the design of the pad holder and friction pads. In particular, no additional drillings or changes to the construction of the pad holder affecting the strength of the pad holder are required to retrofit the sensor unit. Retrofitting existing brake pad systems with the sensor unit therefore does not necessarily require approval by the respective national approval authorities.

Particularly preferably, the sensor unit is connected to the brake pad holder, preferably in a non-destructively detachable manner. The sensor unit can be positively and/or non-positively held and/or fastened to the pad holder. In order to ensure that the sensor unit is held securely on the pad holder during braking operation, the connection between the sensor unit and the pad holder can be spring-loaded. However, screwing or riveting the sensor unit to and/or with the pad holder is not excluded. However, a material-locking connection, for example by gluing, is also not excluded.

In particular, the sensor unit can be inserted, plugged and/or pushed into a recess, opening or cavity in and/or on the pad holder and then fixed to the pad holder by means of a suitable fastener.

In a preferred constructive design, the sensor unit can be arranged at least in sections, preferably for the most part, in a free space formed between the brake lining and the brake lining holder in the assembled state. The dimensions and geometry of the free space is predetermined by the construction of the brake lining and lining holder in the interconnected state (assembly state) of the components. The sensor unit thus fits into the construction of the brake lining system according to the invention, at least in sections, as an integral structural unit. Thus, the sensor unit can be easily integrated into the system design even in existing brake lining systems and then forms an integral structural unit between the brake lining and the brake lining holder. Furthermore, the sensor unit is securely held on the brake lining system and largely protected during rough braking operation due to its arrangement in the free space.

Particularly preferably, the sensor unit can be inserted, pushed or plugged into a free space formed between the brake lining and the lining holder at least in sections from the outside, preferably from the front or on the side of a locking latch of the lining holder, or also laterally.

In this context, the sensor unit can have a base body which is designed as a molded body and whose geometry and dimensions are adapted to the geometry and dimensions of the free space. The base body is then perceived as an integral structural unit between the brake lining and the brake lining holder and is supported downwards in particular on the lining holder. Further, in particular, the base body does not protrude outwards over the brake lining and/or the lining holder, so that the base body is securely arranged between the brake lining and the lining holder and is protected against damage. In particular, the base body can be inserted into the free space from the outside, preferably from the front or on the side of a locking latch of the pad holder.

Particularly preferably, the sensor unit can have a base body which is arranged below the brake lining in the assembly state and/or is inserted into a lining guide of the lining holder in the assembly state, preferably from the front via the insertion opening of the lining guide. A dovetail geometry may be provided on the pad holder for guiding the brake pad on the pad holder. The base body of the sensor unit can then be inserted from the front into the insertion opening in the free space formed between the upper side of the lining holder in the area of the lining guide and the adjacent lower side of the brake lining. Alternatively, the base body could also be held laterally on the pad holder, whereby an eye can be cast on the pad holder, for example, for screwing or riveting the sensor unit to the pad holder.

The invention relates in particular to a brake lining system in which at least one brake lining, preferably two brake linings, lie with a dovetail in a corresponding lining guide of the lining holder and the lining guide can be closed with a one-sided or two-sided bolt. The base body of the sensor unit can then be inserted into the opening of the lining guide on the latch side and is, further preferably, mounted in front of the latch in the assembly or fastening state. The base body can have a stop edge or a projection which, when the sensor unit reaches the assembly state, stops against the lining holder and determines the assembly position.

Preferably, the base body consists of a thermosetting plastic which is preferably not electrically conductive and which is heat-resistant, at least until the maximum operating temperature of the brake lining system and/or the disc brake is reached.

For receiving at least one wear sensor, the base body has at least one sensor section, wherein the base body is preferably formed in one piece with the sensor section and consists of a material which is heat-resistant up to the maximum operating temperature of the brake lining system or the brake disc. Several spaced sensor sections can also be formed on the base body, for example on opposite sides of the base body.

The sensor section is preferably arranged on the outer edge of the base body and, in the assembly state, is preferably located outside the free space formed between the brake lining and the lining holder and/or laterally next to the brake lining. In particular, the sensor section is not covered at the top by the brake lining, so that the possibilities described at the beginning for detecting wear conditions of the brake lining using contact, proximity or temperature sensors can be realized.

If the wear sensor is arranged laterally next to the brake pad, a left-right design of the sensor unit is possible, in which the sensor section is provided on the left or right of the base body of the sensor unit.

The outer surfaces on the upper side and the lower side of the base body preferably define an upper mounting plane and a lower mounting plane of the sensor unit, whereby the base body reaches a maximum thickness between the mounting planes which makes it possible to integrate the base body into a free space between the pad holder and the brake pad. The sensor section can then project upwards beyond the upper mounting plane of the basic body or is formed by a preferably block-shaped projection which has at least one receiving opening for receiving a wear sensor.

Preferably, the sensor section has at least two receiving openings for receiving two wear sensors, whereby the receiving openings can extend upwards to different extents, so that the sensors are arranged at different heights or at different distances from the brake disc in the assembly state. When the pad wear has reached a first abrasion thickness of the friction material or the pad thickness has reached a first limit value, this first state of wear can be detected by the first, higher arranged sensor, which subsequently triggers the generation of a first wear warning or a first closure indication. This can be used, for example, to indicate that a lining replacement will soon be necessary. If the wear continues to increase and the pad wear reaches a second abrasion thickness of the friction material or a defined minimum thickness of the brake pad is reached, this second state of wear can be detected by the second, lower sensor and a wear warning or wear indicator is generated, which indicates an urgently required pad change.

The base body with the sensor section can also be completely underbuilt by the pad holder. Preferably, the sensor section does not protrude laterally or forwards over the pad holder. This protects the sensor section of the sensor unit against external damage as far as possible.

Contact between the sensor or sensors and the evaluation unit can be made by wire via electrical cables which can preferably exit from the underside of the sensor section and be routed to the evaluation unit. In the area of the sensor section, the base body can have a recess on its underside so that a free space is formed between the sensor section and the lower mounting plane of the base body, via which a cable exit from the sensor section and the cable routing to the evaluation unit are possible in a simple manner.

The geometry of the base body in the area of the sensor section can also be adapted to the geometric conditions that are predetermined by the relative arrangement of the pad holder and the brake pad. In particular, the sensor section can have a bevel or chamfer on the side of the brake lining so that the brake lining is spaced from the sensor section in the assembly state.

In an alternative embodiment of the invention, it may be provided that the sensor unit is arranged between two brake pads, preferably in a central region of the pad holder. The sensor section of the base body with the at least one wear sensor then preferably extends vertically upwards between the adjacent brake pads. The base body is firmly seated in the base of the brake lining, in particular in the lining guide. In order to enable the sensor unit to be arranged between adjacent brake linings, the latter can also be shortened and have a reduced extension in the longitudinal direction compared to the length of the brake linings in common brake bellows designs. The sensor section preferably does not protrude laterally over the brake pads.

During assembly, a first brake pad is then inserted into the pad guide via the insertion opening of the pad guide with its dovetail. When this first brake lining has reached its end position, the sensor unit is inserted into the lining guide via the insertion opening of the lining guide until the sensor section abuts against the end face of the already inserted brake lining. Subsequently, the second brake pad is inserted into the pad guide with its dovetail until this brake pad also abuts against the sensor section on the front side. The guide is then closed with a latch. This holds the sensor unit securely between the brake pads and protects it from external damage. The arrangement of the sensor unit between two brake pads fixed to the pad holder can be particularly advantageous for special vehicles.

The signal transmission of the sensor can be wired or wireless via radio. A transponder can also be provided for signal transmission via radio.

The sensor section of the base body of the sensor unit can be provided as a wear element. An electrical conductor can then be provided in the sensor section, which is cut through the brake disc when a certain pad thickness is reached and thus separates a ground connection, which then results in a wear warning. A transponder can also be provided in the sensor section, which is destroyed when a certain pad thickness is reached, so that a signal transmission ends, which results in a wear warning. It is also possible that a conductor is integrated into the sensor section, which contacts the brake disc when a certain degree of wear of the lining is reached, so that ground contact occurs, which then again results in a wear warning. If the sensor section or the base body of the sensor unit as a whole is made of an electrically conductive material, a ground contact can also occur when a certain degree of wear of the friction lining is reached and the brake disc touches the sensor section.

BRIEF DESCRIPTION OF THE DRAWINGS

The invention is explained below by means of an example of an embodiment with reference to the enclosed drawings.

DETAILED DESCRIPTION

Figures 1, 2:
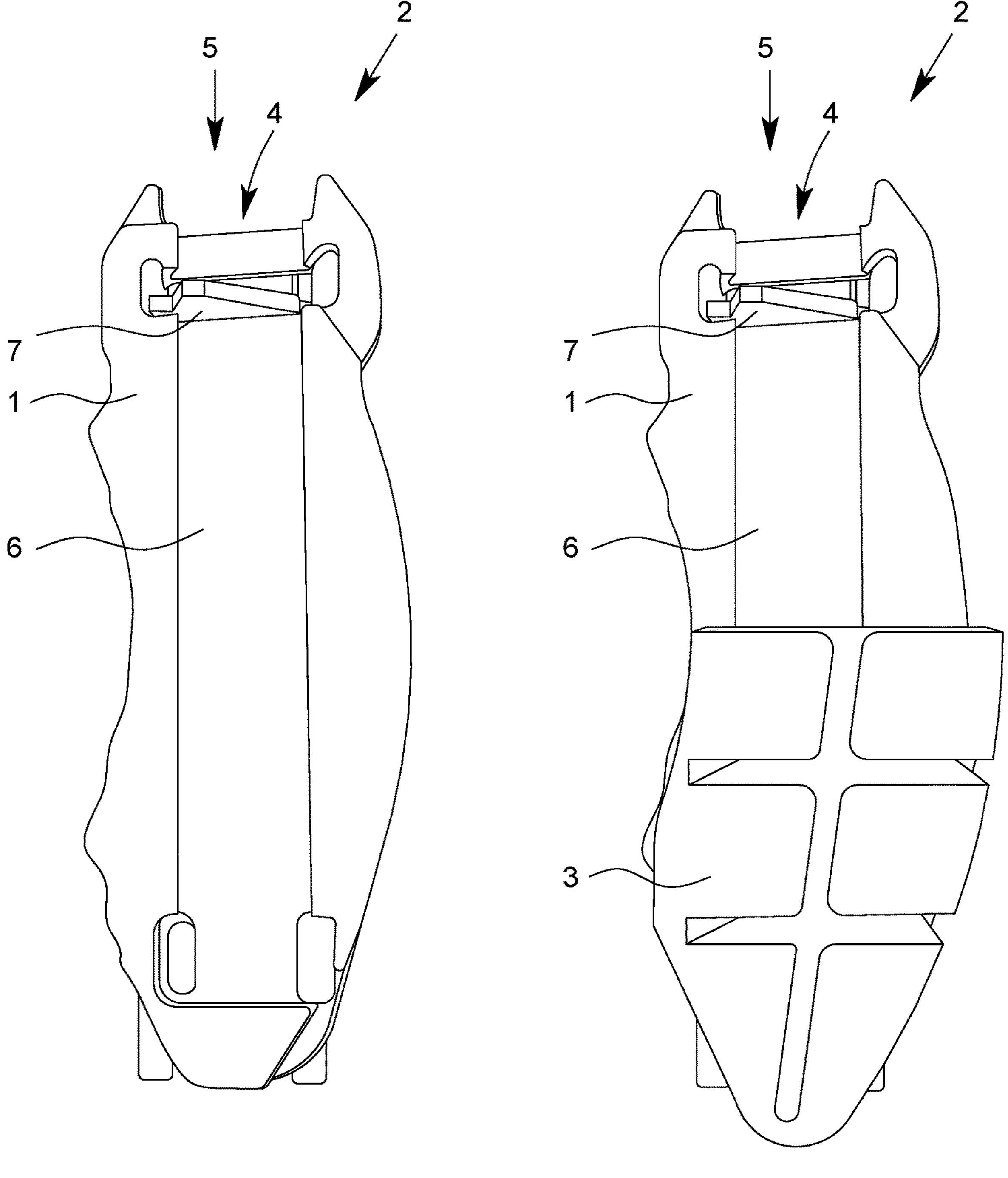
FIG. 1 is a perspective view of a pad holder of a brake pad system according to the invention in an oblique view from above.
FIG. 2 is a perspective view of a brake lining system according to the invention in a partially assembled state when a brake lining is fixed to the lining holder of FIG. 1.

FIG. 1 shows a pad holder 1 of a brake lining system 2 shown in FIG. 2 in a partially assembled state. The brake lining system 2 is designed to attach two brake pads 3 to the pad holder 1. The brake pads 3 have dovetail geometries on the underside and are each inserted with a dovetail via an insertion opening 4 of the pad holder 1 on the latch side 5 of the brake lining system 2 into a pad guide 6 of the pad holder 1. When both brake pads 3 have reached the respective mounting position, the pad guide 6 is closed with a bolt 7 in a manner known per se. A corresponding bolt lock is described, for example, in DE 35 43 457 A1 and DE 42 27 725 A1.

Figure 3:
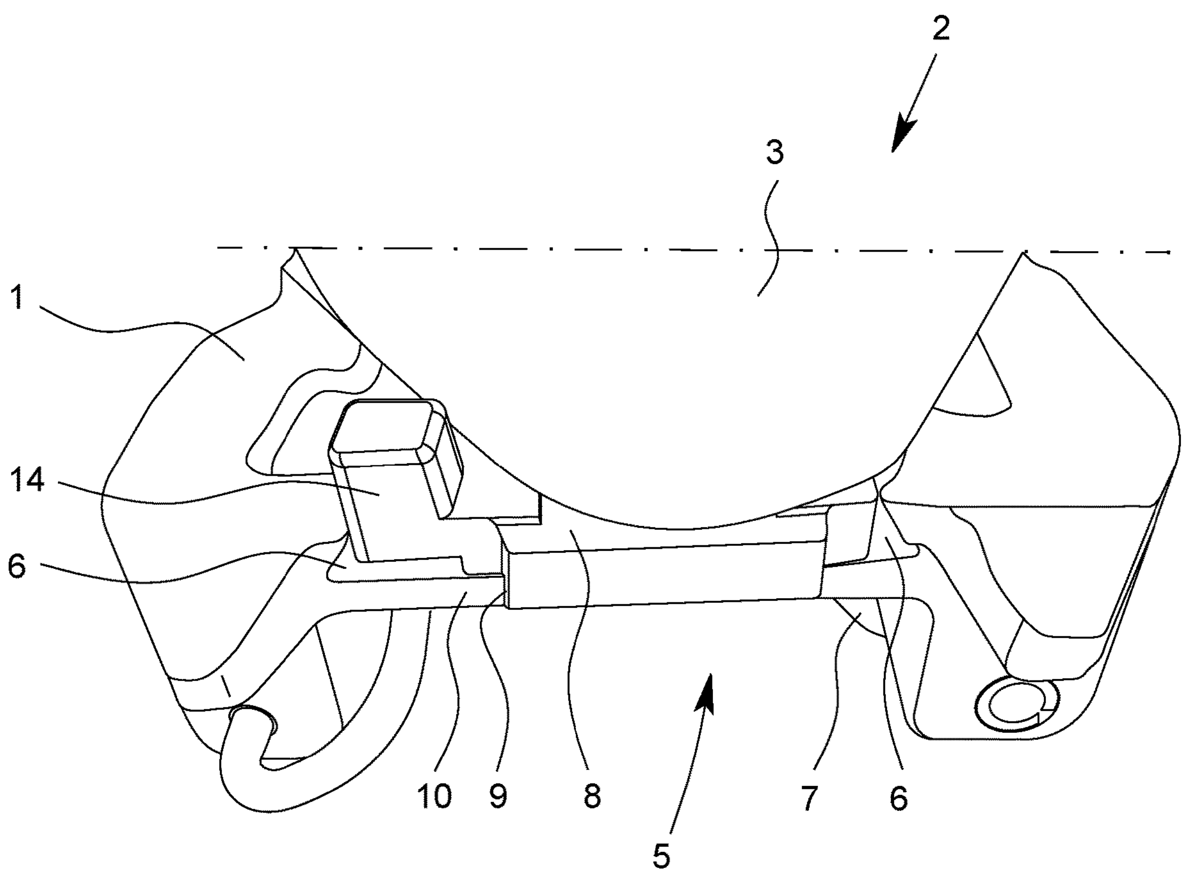
FIG. 3 is a partial perspective view of the latch side of a brake pad system according to the invention with a sensor unit arranged between the pad holder and a front brake pad, viewed from the front.
Figure 4:
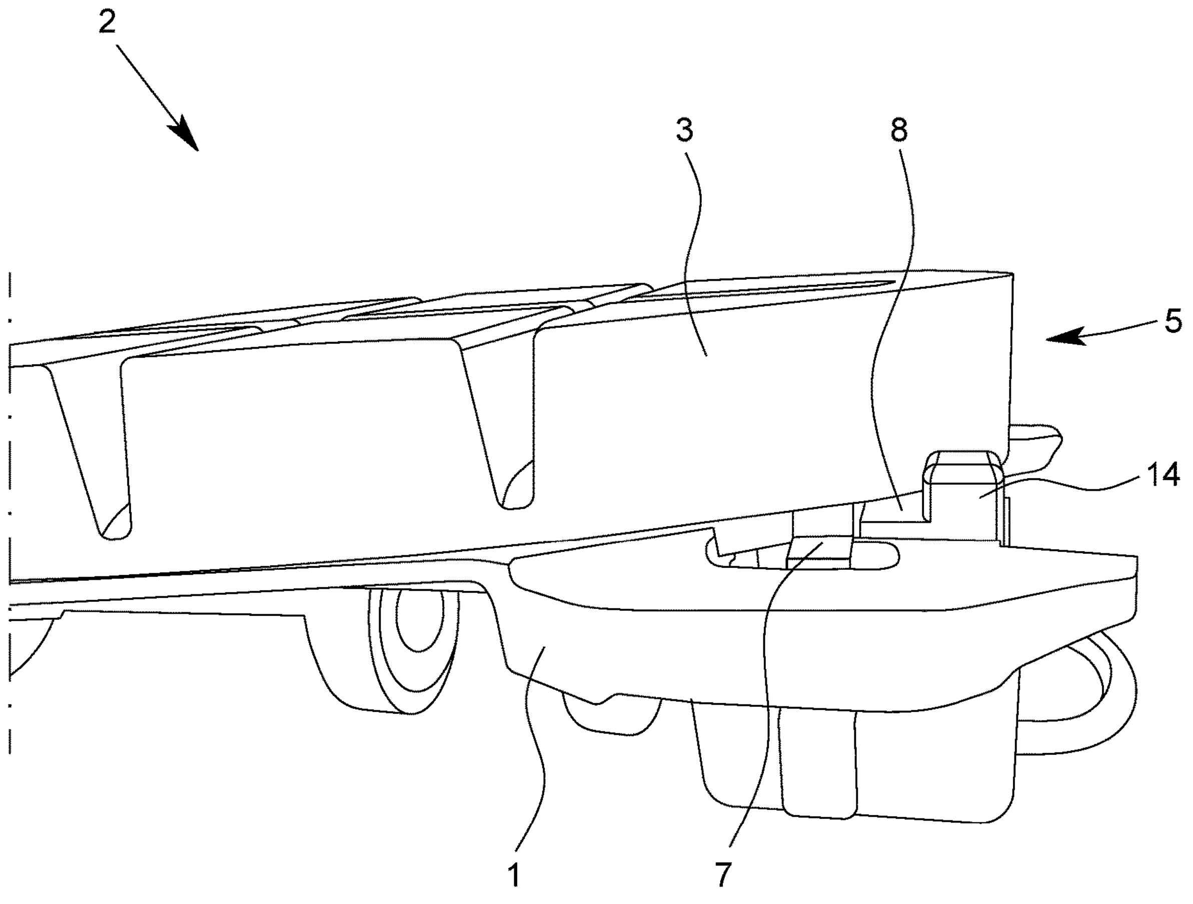
FIG. 4 is a partial view of the latch side of the brake lining system shown in FIG. 3, viewed from the side.
Figure 5:
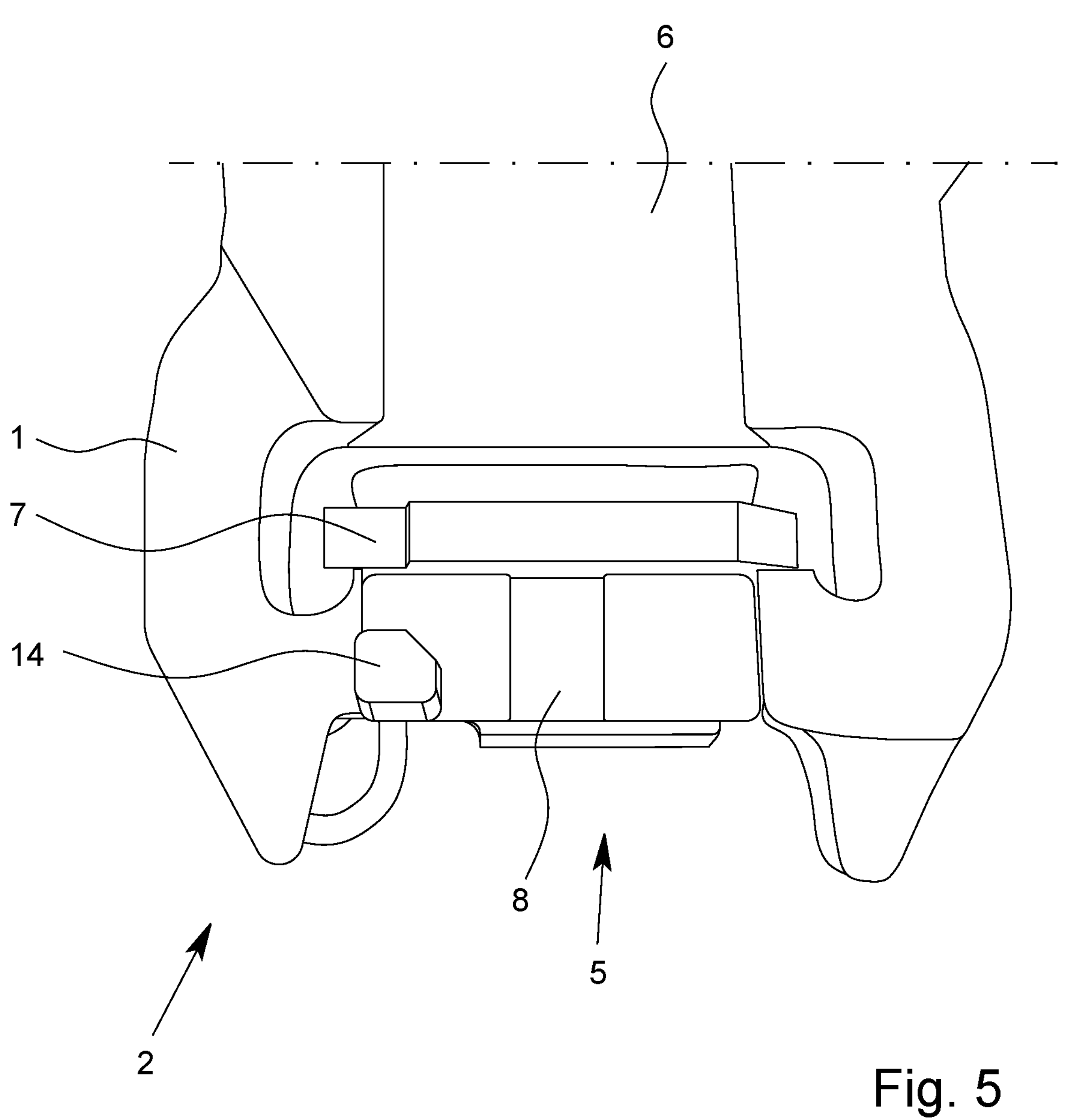
FIG. 5 is a partial view of the latch side of the brake lining system shown in FIG. 3, viewed from above.

In FIG. 3, the brake lining system 2 is shown in an assembled state of lining holder 1 and brake linings 3, looking in the direction of the latch side 5 of the brake lining system 2. As can be seen from FIG. 3, a sensor unit 8 is arranged, at least in sections, in a free space formed between the lining holder 1 and the latch-side brake lining 3 in the assembled state of the brake lining system 2. FIG. 4 shows the latch side 5 of the brake lining system 2 from the side and FIG. 5 shows the latch side 5 of the brake lining system 2 from above before the brake lining 3 is mounted on the lining holder 1.

Figure 8:
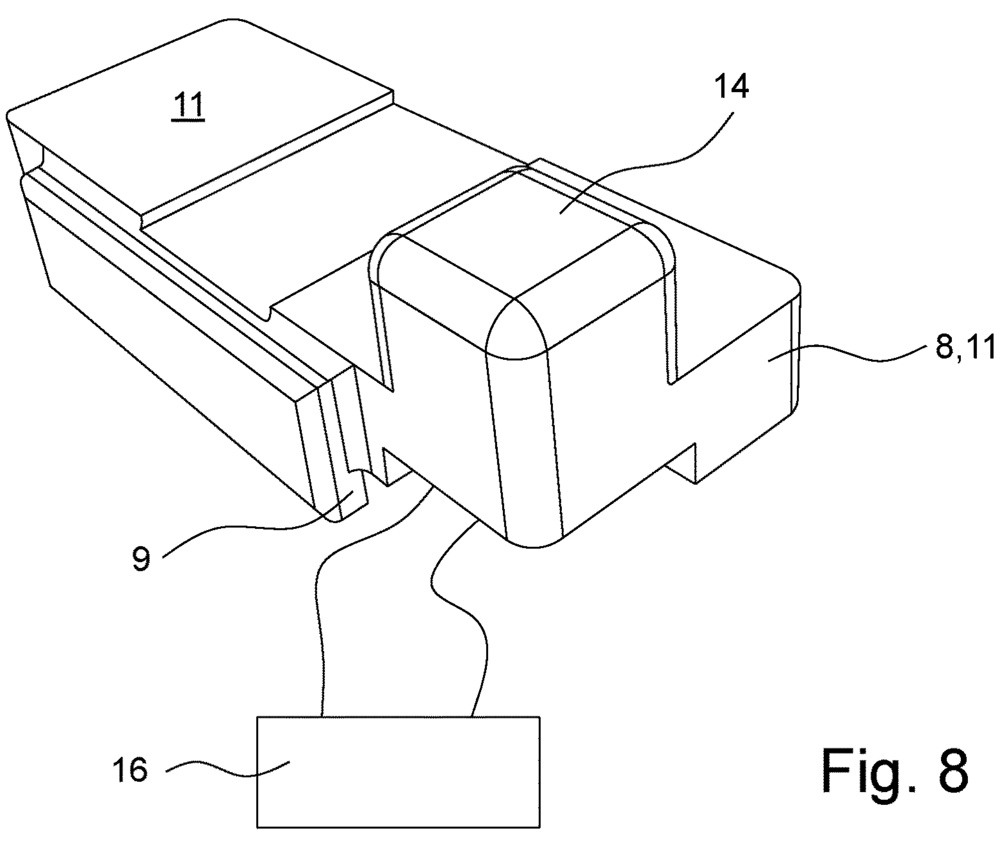
FIG. 8 is the sensor unit from FIG. 6 with wired signal transmission between the sensor unit and an evaluation unit.
Figure 9:
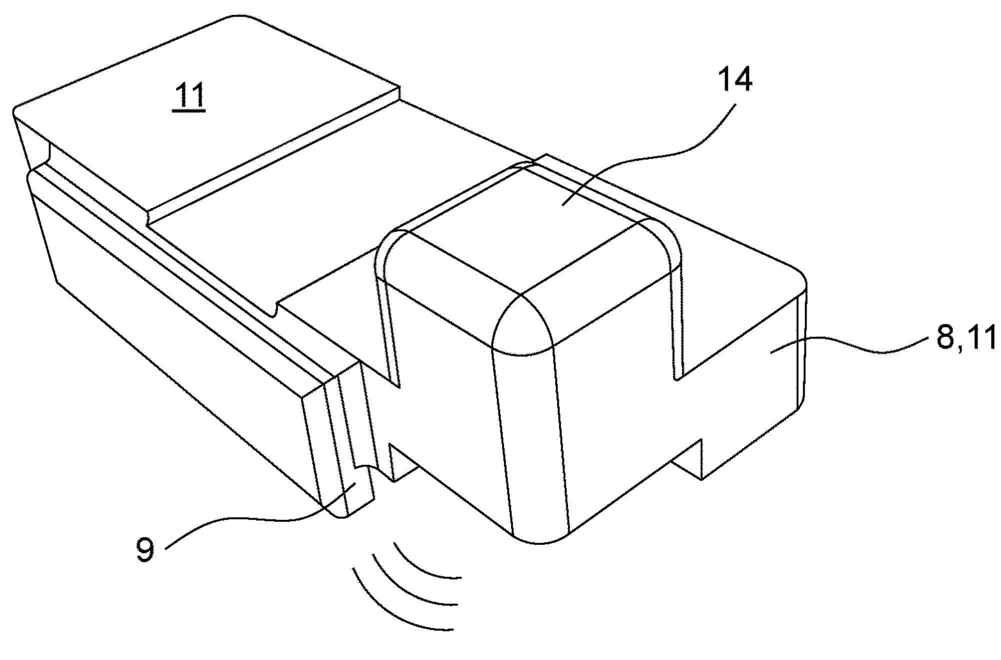
FIG. 9 is the sensor unit from FIG. 6 with wireless signal transmission between the sensor unit and an evaluation unit.

The sensor unit 8 is connected to an evaluation unit 16 shown schematically in FIGS. 8 and 9, the sensor unit 8 having at least one contact, proximity or temperature sensor or being designed as such for determining at least one state of wear of the brake lining 3. The evaluation unit 16 is set up and designed for evaluating the sensor signals and for generating a wear warning and/or a wear indication. A sensor device may comprise corresponding indicating devices, such as indicator lamps or the like. The evaluation unit 16 and any display devices are arranged at a distance from the pad holder 1 and the brake pads 3.

In particular, the sensor unit 8 is a separate structural unit, further in particular a retrofit part, which is adapted in terms of geometry and dimensions to the system design of the brake lining system 2, in particular to the geometry and dimensions of the free space formed between the lining holder 1 and the friction lining 3 on the latch side 5 of the brake lining system 2, which is used to accommodate the sensor unit 8. In the embodiment shown, the sensor unit 8 is inserted into the lining guide 6 of the lining holder 1 on the latch side via the insertion opening 4, whereby the sensor unit 8 can come to rest against the latch 7 on the inside, but not necessarily. The sensor unit 8 is then clamped to the covering holder 1 by a spring not shown. The sensor unit 8 is thus positioned in front of the bolt 7 and is supported on the lining guide 6 of the lining holder 1. A stop edge 9 is formed on the outside of the sensor unit 8 which, when the sensor unit 8 is mounted, rests from the outside against an outer surface 10 of the covering holder 1 and determines a mounting position of the sensor unit 8.

Figure 6:
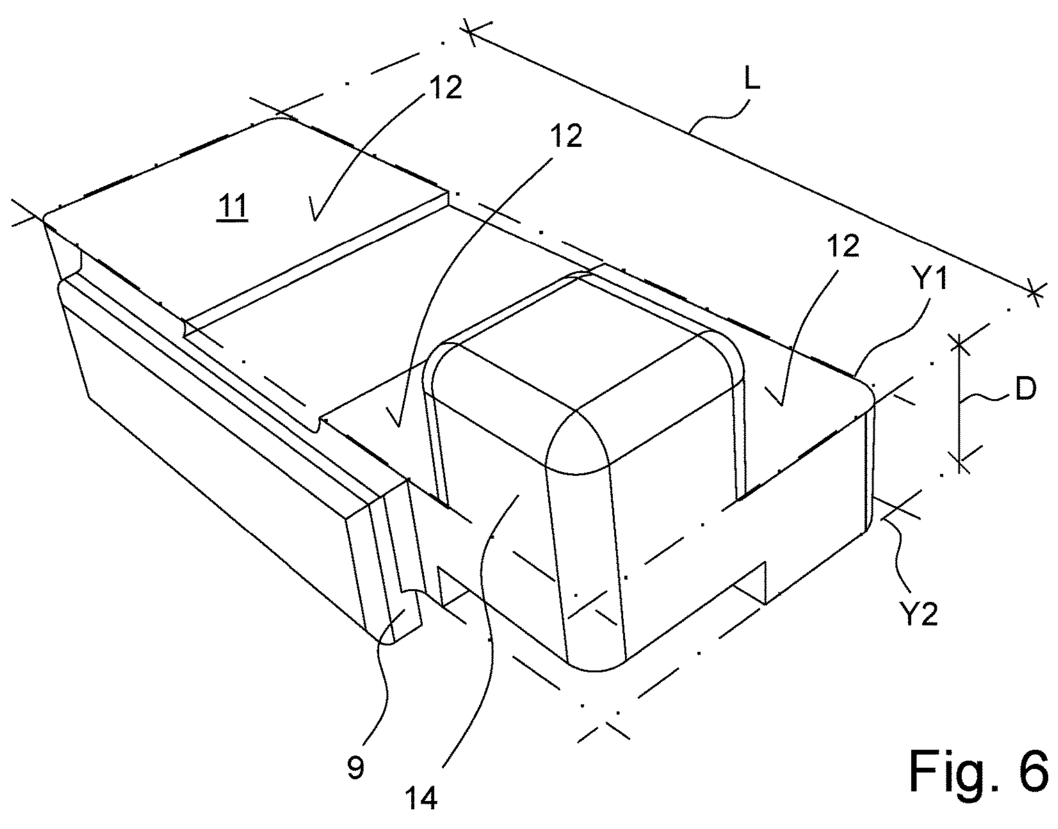
FIG. 6 is a perspective view of a possible embodiment of a sensor unit for a brake lining system according to the invention, seen obliquely from above.
Figure 7:
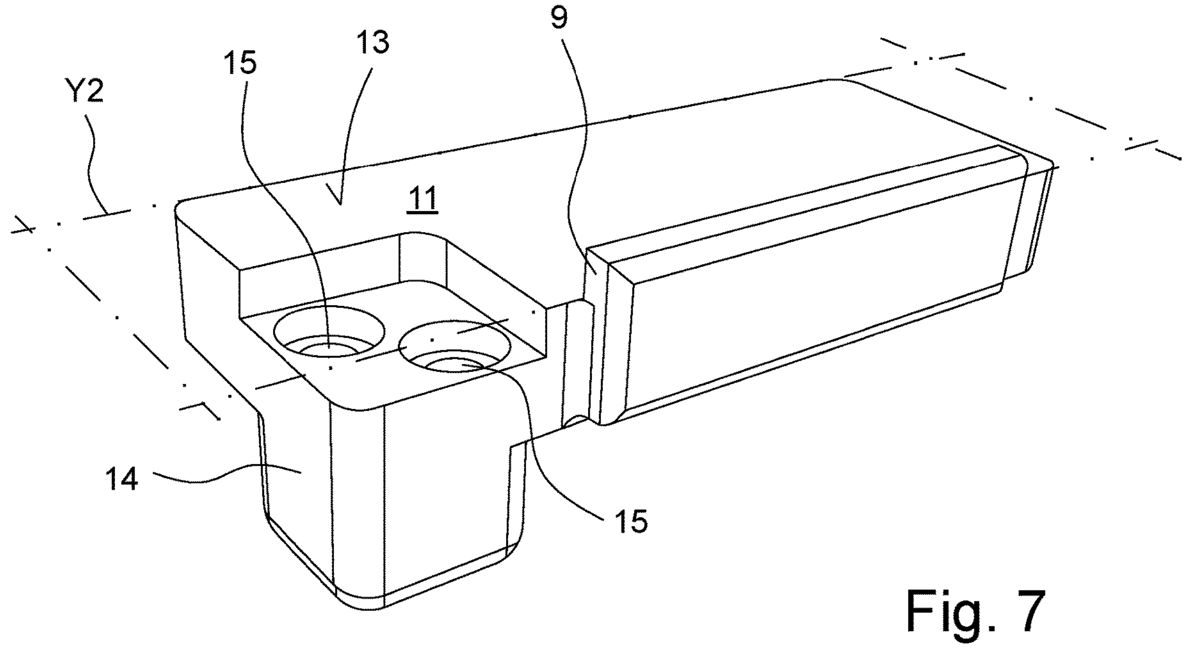
FIG. 7 is a partial perspective view of the sensor unit from FIG. 6, viewed obliquely from below.

As can be seen in particular from FIGS. 6 and 7, the sensor unit 8 has a base body 11 whose geometry and dimensions are adapted to the geometry and dimensions of the free space formed between the pad holder 1 and the brake pad 3 on the latch side in the mounted state of the brake pad system 2. This relates in particular to the length L and the thickness D of the basic body 11 in relation to an upper mounting plane Y1 and a lower mounting plane Y2 of the basic body 11. The upper mounting plane Y1 is defined by the edge-side outer surfaces 12 on the upper side of the basic body 11 and the lower mounting plane Y2 is defined by the outer surface 13 on the lower side of the basic body 11. The thickness D of the basic body 11 is selected in such a way that it can be inserted in the region of the lining guide 6 between the lining holder 1 and the friction lining 3. The length L of the base body 11 is smaller than the opening width of the lining guide 6 of the lining holder 1.

On the upper side, the base body 11 has a central recess between the outer surfaces 12 on the edge side, via which a spring element not shown can be guided and/or held, which serves to fasten the base body 11 to the lining holder 1.

As can be seen from FIG. 3, the base body 11 is arranged essentially below the brake pad 3 in the assembled state and is supported on the pad holder 1 in the area of the pad guide 6.

The base body 11 has a sensor section 14 in the form of a block-like projection, which is provided for receiving two wear sensors and has two receiving openings 15 on its underside for this purpose. The receiving openings 15 preferably extend into the sensor section 14 to different extents or, in the mounted state of the sensor unit 8, upwards, so that the sensors are arranged at different heights or at different distances from the brake disc in relation to a brake disc of the disc brake.

The base body 11 of the sensor unit 8 is preferably formed integrally with the sensor section 14, which is formed as a block-like projection.

The sensor section 14 is formed as a projection and extends upwards beyond the upper mounting plane Y1 of the base body 11. In the assembled state (FIG. 3) of the brake lining system 2, the sensor section 14 is located outside the free space formed between the lining holder 1 and the brake lining 3 and is arranged laterally next to the brake lining 3.

Several sensor sections 14 can also be formed on the base body 11, for example opposite each other on both transverse sides.

The wear sensors may be electrical conductors. When the brake pad wear has reached a certain value, the disc brake cooperating with the brake lining system 2 may come into contact with the sensor section 14 and wear of the sensor section 14 occurs starting from its upper side. The sensor section 14 thereby acts as a wear element. When the sensor section 14 is sufficiently worn away from the brake disc, which corresponds to a certain pad wear or a certain remaining pad thickness of the brake pads, the brake disc can come into contact with the electrical conductor and a ground contact occurs, which leads to the generation of a wear warning or wear indication. Alternatively, it is possible for a conductor loop integrated into the sensor section 14 to be severed by the brake disc, resulting in a ground connection, which can also result in a wear warning or wear indication. A transponder can also be integrated in the sensor section 14, which is in radio communication with the evaluation unit 16. If the transponder is destroyed when the sensor section 14 is worn, the data transmission ends, which can lead to the generation of a wear warning or wear indication.

The base body 11 has a recess on its underside in the area of the sensor section 14, via which a cable connection can be made with the wear sensors integrated in the receiving openings 15.

FIG. 5 shows the sensor unit 8 in the left-hand version, when the sensor section 14 is arranged on the left half of the pad holder 1. It is not shown that a right-hand version of the sensor unit 8 with the sensor section 14 on the right is also possible.

The first, higher positioned sensor can detect a wear condition of the brake lining 3 corresponding to a first, greater residual lining thickness, while a second, lower positioned sensor can detect a brake lining wear corresponding to a second, lesser residual lining thickness. The sensor signal from the first, higher sensor can then be interpreted as an indication of an imminent brake lining change, while the sensor signal from the second, lower sensor can be interpreted as an indication of an urgent brake lining change.

FIGS. 8 and 9 show that a signal transmission between the sensor unit 8 and an evaluation unit 16 can take place by wire (FIG. 8) or wirelessly via radio (FIG. 9).

Figures 10, 11:
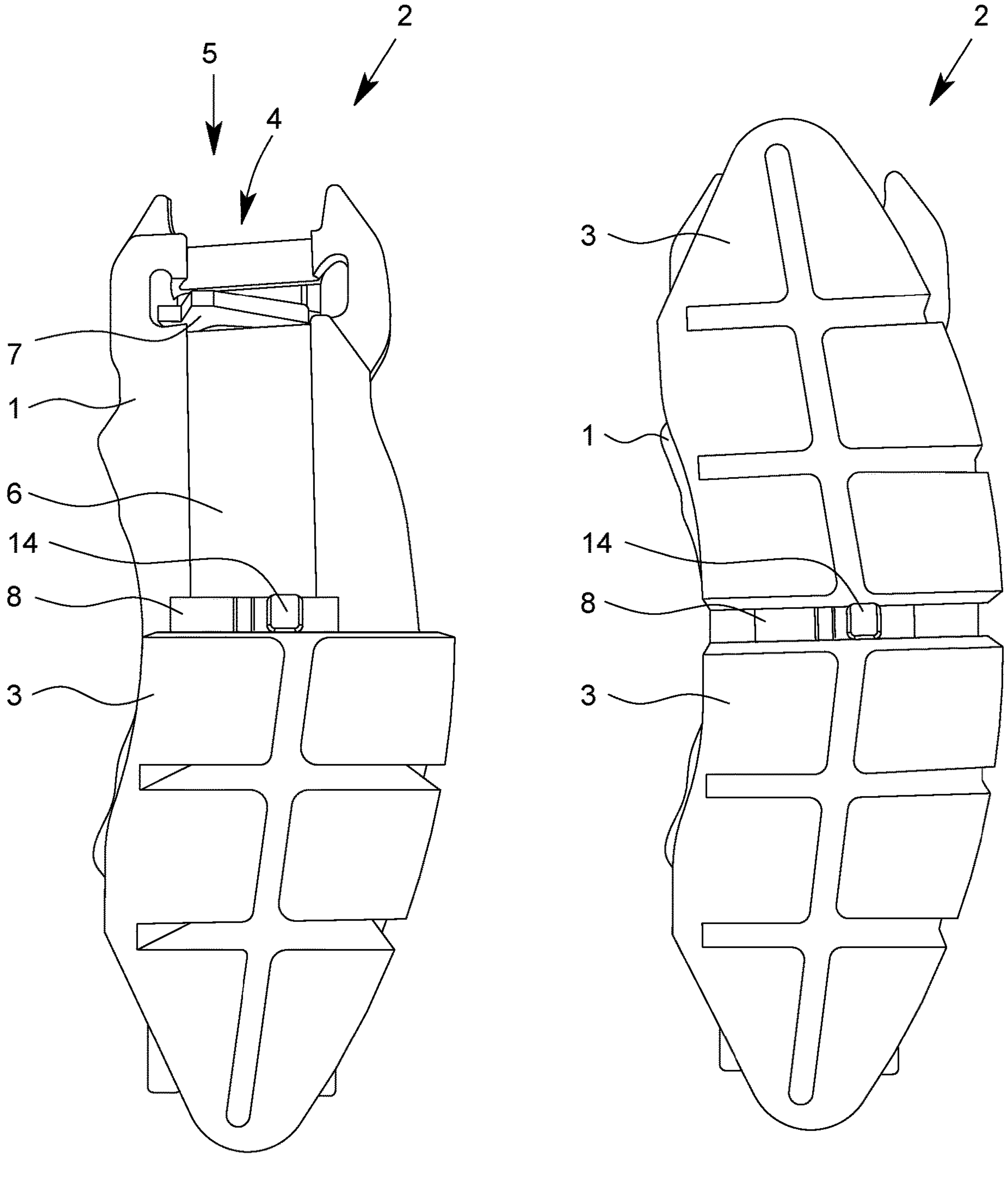
FIG. 10 is another embodiment of a brake lining system according to the invention, in which a sensor unit is arranged between two friction linings mounted on a lining holder, in a perspective view from above in the partially assembled state of the brake lining system.
FIG. 11 is a perspective view of the brake lining system of FIG. 10 from above in the fully assembled state of the brake lining system.

In FIGS. 10 and 11 an alternative embodiment of a brake lining system 2 according to the invention is shown, wherein FIG. 10 shows a partially assembled state and FIG. 11 the fully assembled state of the brake lining system 2. The brake lining system 2 has a lining holder 1 and, in the fully assembled state, two brake linings 3 mounted on the lining holder 1.

In the embodiment shown in FIGS. 10 and 11, the sensor unit 8 is arranged in a central area of the pad holder 1 between two brake pads 3. Here, a base body of the sensor unit 8 is inserted into the pad guide 6 and/or is supported on the pad holder 1 in the area of the pad guide 6. A sensor section 14 projects vertically upwards from the base body in the direction of the surface of the brake pads 3. Preferably, the sensor unit 8 is held positively on the pad guide 6 and can have a dovetail geometry on the underside of the base body for this purpose, for example.

LIST OF REFERENCE SIGNS

1 Pad holder
2 Brake lining system
3 Brake pad
4 Insertion opening
5 Latch side
6 Pad guide
7 Latch
8 Sensor unit
9 Stop edge
10 Outer surface
11 Base body
12 External surface
13 Outer surface
14 Sensor section
15 Receiving opening
16 Evaluation unit

The invention claimed is:

1. A brake lining system for a disc brake of a rail vehicle, the brake lining system comprising:
- a pad holder defining a pad guide;
- at least one brake pad connected to the pad holder, wherein a free space is formed between the pad holder and the at least one brake pad in an assembled state; and
- a sensor device with a sensor unit having at least one wear sensor for determining a state of wear of the brake pad, the sensor unit comprising:
  - a base body introduced into the pad guide of the pad holder and positioned in the free space.

2. The brake lining system according to claim 1, wherein the sensor unit forms a separate structural unit.

3. The brake lining system according to claim 2, wherein the sensor unit is a retrofit part.

4. The brake lining system according to claim 1, wherein the sensor unit is connected to the pad holder.

5. The brake lining system according to claim 4, wherein the sensor unit is connected to the pad holder in a non-destructively detachable manner.

6. The brake lining system according to claim 1, wherein the base body defines geometry and dimensions that are adapted, at least in sections, to the geometry and dimensions of the free space.

7. The brake lining system according to claim 6, wherein the base body has a sensor section for receiving the at least one wear sensor.

8. The brake lining system according to claim 7, wherein the sensor section is arranged outside the free space formed between the pad holder and the brake pad and/or laterally next to the brake pad.

9. The brake lining system according to claim 1, wherein the at least one brake pad comprises two brake pads and wherein the sensor unit is arranged between the two brake pads.

10. The brake lining system according to claim 9, wherein the sensor unit is arranged in the central region of the pad holder.

11. The brake lining system according to claim 1, wherein a sensor section is provided as a wear element of the sensor unit.

12. A sensor unit for a sensor device of a brake lining system according to claim 1.

* * * * *